United States Patent
Chen et al.

(10) Patent No.: US 10,138,066 B2
(45) Date of Patent: Nov. 27, 2018

(54) SUBSTRATE TRANSPORTING DEVICE AND RELATED PROCESSING SYSTEM

(71) Applicant: Shenzhen China Star Optoelectronics Technology Co., Ltd., Shenzhen, Guangdong (CN)

(72) Inventors: Lei Chen, Guangdong (CN); Dong Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 199 days.

(21) Appl. No.: 15/125,574

(22) PCT Filed: May 26, 2016

(86) PCT No.: PCT/CN2016/083557
§ 371 (c)(1),
(2) Date: Sep. 12, 2016

(87) PCT Pub. No.: WO2017/156876
PCT Pub. Date: Sep. 21, 2017

(65) Prior Publication Data
US 2018/0162649 A1  Jun. 14, 2018

(30) Foreign Application Priority Data

Mar. 17, 2016  (CN) .................... 2016 2 0214168 U

(51) Int. Cl.
*B65G 19/02*  (2006.01)
*B65G 15/12*  (2006.01)
(Continued)

(52) U.S. Cl.
CPC ............. *B65G 19/02* (2013.01); *B65G 15/12* (2013.01); *B65G 47/24* (2013.01); *B65G 49/06* (2013.01); *B65G 2207/14* (2013.01)

(58) Field of Classification Search
CPC ........ B65G 19/02; B65G 15/12; B65G 49/06; B65G 2207/14
See application file for complete search history.

(56) References Cited

U.S. PATENT DOCUMENTS 3,992,182 A * 11/1976 Frank ................... B65G 49/067
                                                            198/434
4,895,244 A *  1/1990 Flaugher ........... B32B 17/10954
                                                            198/394

(Continued)

*Primary Examiner* — Mark A Deuble
(74) *Attorney, Agent, or Firm* — Andrew C. Cheng

(57) ABSTRACT

The present disclosure proposes a substrate transporting device having a drive motor configured to drive the drive shaft, transporting belts driven by the drive shaft and configured to transport glass substrates at an operating speed when the drive shaft is driven by the drive motor, a rail arranged between the transporting belts, and a pushing block arranged on the rail and moving along a transporting direction of the glass substrates at a moving speed in accordance with the operating speed of the transporting belts, for pushing the glass substrate to shift horizontally along the transporting direction of the glass substrate to prevent the glass substrate from being crooked. In this way, the orientation of the glass substrate is corrected, and the accuracy of the transportation of the glass substrate is ensured. The occurrence of machine disorder due to a crooked glass panel is reduced as well.

14 Claims, 2 Drawing Sheets

(51) Int. Cl.
*B65G 47/24* (2006.01)
*B65G 49/06* (2006.01)

(56) References Cited

U.S. PATENT DOCUMENTS

| | | | | |
|---|---|---|---|---|
| 4,976,766 | A * | 12/1990 | Kuster | B65G 47/22 |
| | | | | 198/411 |
| 5,927,469 | A * | 7/1999 | Dunifon | B32B 17/10954 |
| | | | | 198/345.1 |
| 6,419,075 | B1 * | 7/2002 | Ramirez-Martinez | |
| | | | | C03B 35/16 |
| | | | | 198/400 |
| 6,851,250 | B2 * | 2/2005 | Whitby | B65B 57/14 |
| | | | | 198/456 |
| 9,260,246 | B2 * | 2/2016 | Nishimura | H01L 21/67706 |

* cited by examiner

US 10,138,066 B2

SUBSTRATE TRANSPORTING DEVICE AND RELATED PROCESSING SYSTEM

CROSS REFERENCE

This application claims the benefit and priority of Chinese Application No. 201620214168.7, entitled "Substrate Transporting Device and Related Processing System", filed on Mar. 17, 2016, the disclosure of which is incorporated herein by reference in its entirety.

FIELD OF THE INVENTION

The present invention relates to the field of a transporting device, and more particularly, to a substrate transporting device and a substrate processing system.

BACKGROUND OF THE INVENTION

A liquid crystal panel is transported to a division section with a transporting belt in the conventional technology. For example, a glass panel of the G8.5 generation is transported with no more than six transporting belts. However, the tightness of each of the transporting belts and a drive shaft is different so the synchronization of each of the six transporting belts is not perfectly consistent during the manufacturing process. The glass substrate may become crooked in transportation, resulting in abnormality.

SUMMARY OF THE INVENTION

It is therefore one of the primary objectives of the claimed invention to provide a substrate transporting device to ensure the accuracy of glass transportation and lower the occurrence of machine disorder due to a crooked glass panel.

According to the present invention, a substrate transporting device includes a drive shaft, a drive motor configured to drive the drive shaft, a plurality of transporting belts driven by the drive shaft and configured to transport glass substrates at an operating speed when the drive shaft is driven by the drive motor, a rail arranged between the plurality of transporting belts, and a pushing block arranged on the rail and moving along a transporting direction of the glass substrates at a moving speed in accordance with the operating speed of the transporting belts, for pushing the glass substrate to shift horizontally along the transporting direction of the glass substrate to prevent the glass substrate from being crooked.

In at least one embodiment, the pushing block comprises a cylinder, a first bump, and a second bump; the first bump is connected to a piston rod of the cylinder; the piston rod drives the first bump to move along a direction perpendicular to a plane of the glass substrate; the second bump is arranged on the first bump; the first bump extends along a direction parallel to the plane of the glass substrate; the second bump extends along the direction perpendicular to the plane of the glass substrate.

In at least one embodiment, the rail extends along the transporting direction of the glass substrate.

In at least one embodiment, the rail is fixed between the transporting belts so that the pushing block moves along the transporting direction of the glass substrate along the rail.

In at least one embodiment, the pushing block and the rail are fixedly connected so that the rail moves along the transporting direction of the glass substrate.

In at least one embodiment, the number of both of the pushing block and the rail is two, and the two pushing blocks are arranged on the two rails respectively and move simultaneously.

In at least one embodiment, the first bump and the second bump are integrally formed.

According to the present invention, a processing system includes the substrate transporting device as provided above.

Compared with the conventional technology, a pushing block is arranged between transporting belts to push a glass substrate to move along a transporting direction in this present invention. In this way, the orientation of the glass substrate is corrected, and the accuracy of the transportation of the glass substrate is ensured. The occurrence of machine disorder due to a crooked glass panel is reduced as well.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. Specifically, the terminologies in the embodiments of the present invention are merely for describing the purpose of the certain embodiment, but not to limit the invention.

Figure 1:
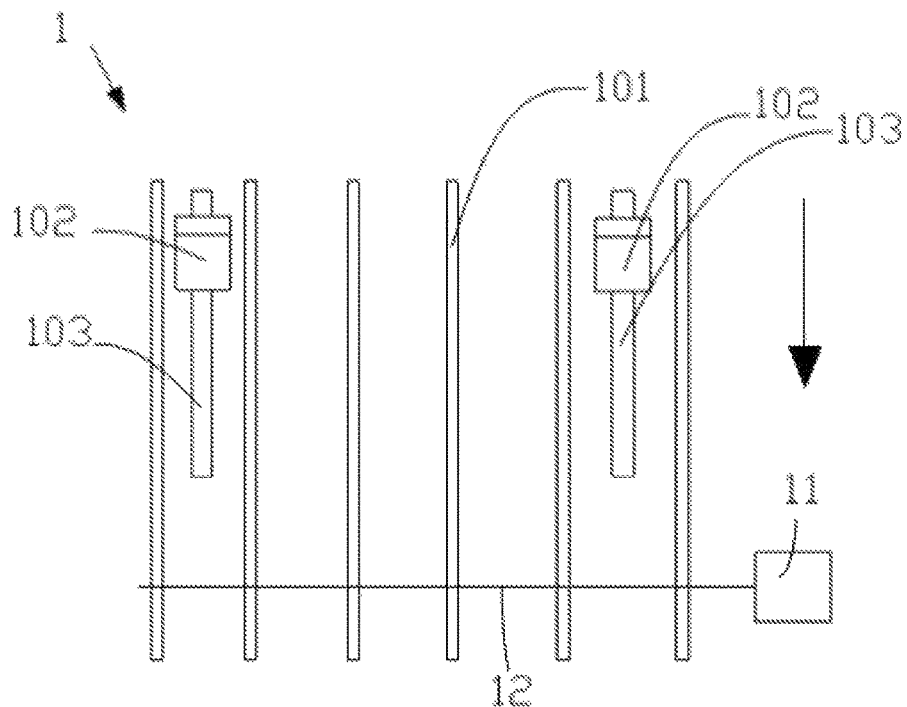
FIG. 1 shows a top view of a substrate transporting device according to one preferred embodiment of the present invention.

Please refer to FIG. 1 showing a top view of a substrate transporting device 1 according to one preferred embodiment of the present invention. The substrate transporting device 1 comprises transporting belts 101, a drive shaft 12, a drive motor 11, a pushing block 102, and a rail 103. The drive motor 11 operates by driving the transporting belts 101 with the drive shaft 12 to transport a glass substrate (not shown) on the transporting belts 101. The rail 103 is arranged between the transporting belts 101 and extends along the transporting direction of the glass substrate as an arrow in FIG. 1 shows. The pushing block 102 is arranged on the rail 103 and moves along the transporting direction of the glass substrate. The moving speed of the pushing block 102 is in accordance with the rotating speed of the transporting belts 101 to push the glass substrate to shift horizontally along the transporting direction of the glass substrate to prevent the glass substrate from being crooked. The number of the transporting belts 101 is six. The number of the pushing block 102 is preferably two. The number of the rail 103 is preferably two as well. The two pushing blocks 102 are arranged near the edge of the transporting belts 101. The two pushing blocks 102 are arranged on the two rails 103 respectively and move simultaneously to lean against two peripheral ends of the glass substrate to push the glass substrate to move. Compared with the conventional technology, the pushing blocks 102 are used to push the moving of the glass substrate successfully based on the substrate transporting device 1 in the present invention even though synchronization of the transporting belts 101 is not completely consistent. The present invention makes sure that the glass substrate is not crooked and does not cause abnormality.

In one of the preferred embodiments in the present invention, the rail 103 is fixed between the transporting belts 101 so that the pushing block 102 can move along the transporting direction of the glass substrate along the rail 103 using the drive of the drive device.

In another one of the preferred embodiments in the present invention, the pushing block 102 and the rail 103 are fixedly connected so that the rail 103 can move along the transporting direction of the glass substrate using the drive of the drive device to move the pushing block 102 successively.

Figure 2:
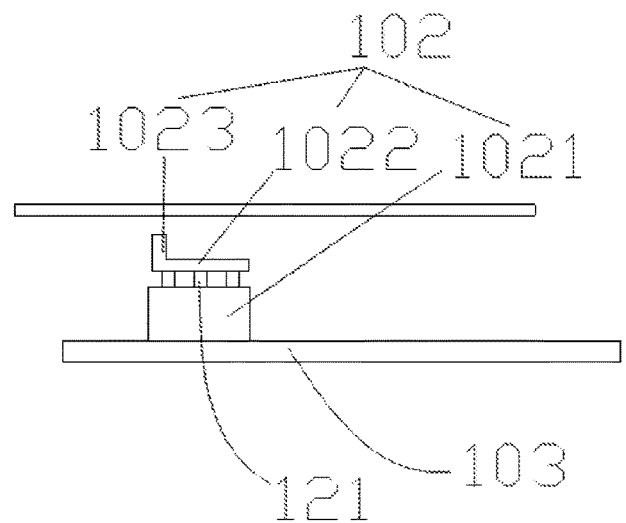
FIG. 2 shows the pushing block and the rail when the cylinder moves downwards.

The pushing block 102 comprises a cylinder 1021, a first bump 1022, and a second bump 1023. The first bump 1022 is connected to a piston rod 121 of the cylinder 1021. The second bump 1023 is arranged on the first bump 1022. The first bump 1022 extends along a direction parallel to the plane of the glass substrate. The second bump 1023 extends along a direction perpendicular to the plane of the glass substrate. In FIG. 2, the piston rod 121 of the cylinder 1021 is at the descending stage, so the moving of the glass substrate is avoided by the piston rod 121.

Figure 3:
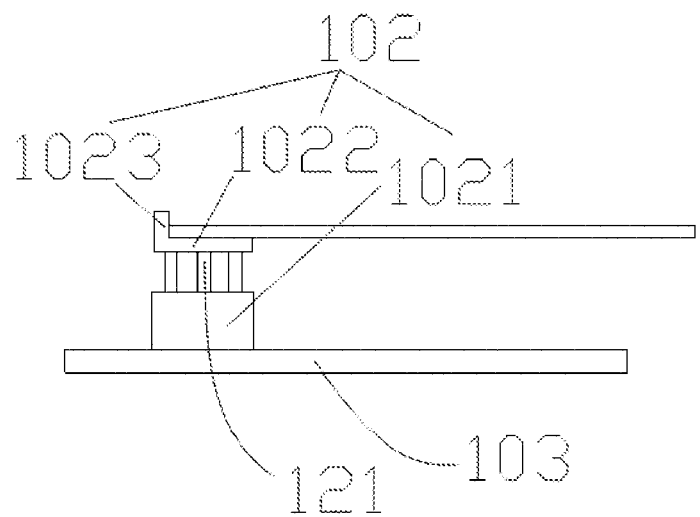
FIG. 3 shows the pushing block and the rail when the cylinder moves upwards.

Please refer to FIG. 3. When the glass substrate is moved to a place near the pushing block 102, the piston rod 121 of the cylinder 1021 moves upwards and push the first bump 1022 and the second bump 1023 upwards. Afterwards, the glass substrate continues to move forwards for a certain distance. The second bump 1023 holds a lower surface of the glass substrate; meanwhile, the first bump 1022 leans against the edge of the glass substrate to exert action force on the glass substrate, so the moving direction of the glass substrate is corrected. Therefore, the glass substrate does not become crooked and abnormal. The following processing of the glass substrate will not be affected, either.

Preferably, the first bump 1022 and the second bump 1023 are integrally formed for facilitating processing. It is also possible that the first bump 1022 and the second bump 1023 are independent components.

Above are embodiments of the present invention, which does not limit the scope of the present invention. Any modifications, equivalent replacements or improvements within the spirit and principles of the embodiment described above should be covered by the protected scope of the invention.

What is claimed is:

1. A substrate transporting device, comprising:
a drive shaft;
a drive motor, configured to drive the drive shaft;
a plurality of transporting belts, driven by the drive shaft and configured to transport glass substrates at an operating speed when the drive shaft is driven by the drive motor;
a rail, arranged between the plurality of transporting belts;
a pushing block, arranged on the rail and moving along a transporting direction of the glass substrates at a moving speed in accordance with the operating speed of the transporting belts, for pushing the glass substrate to shift horizontally along the transporting direction of the glass substrate to prevent the glass substrate from being crooked; and
wherein the pushing block comprises a cylinder, a first bump, and a second bump; the first bump is connected to a piston rod of the cylinder; the piston rod drives the first bump to move along a direction perpendicular to a plane of the glass substrate; the second bump is arranged on the first bump; the first bump extends along a direction parallel to the plane of the glass substrate; the second bump extends along the direction perpendicular to the plane of the glass substrate.

2. The substrate transporting device of claim 1, wherein the rail extends along the transporting direction of the glass substrate.

3. The substrate transporting device of claim 2, wherein the rail is fixed between the transporting belts so that the pushing block moves along the transporting direction of the glass substrate along the rail.

4. The substrate transporting device of claim 2, wherein the pushing block and the rail are fixedly connected so that the rail moves along the transporting direction of the glass substrate.

5. The substrate transporting device of claim 3, wherein the number of both of the pushing block and the rail is two, and the two pushing blocks are arranged on the two rails respectively and move simultaneously.

6. The substrate transporting device of claim 5, wherein the number of both of the pushing block and the rail is two, and the two pushing blocks are arranged on the two rails respectively and move simultaneously.

7. The substrate transporting device of claim 6, wherein the first bump and the second bump are integrally formed.

8. A processing system, comprising a substrate transporting device, the substrate transporting device comprising:
a drive motor, configured to drive a drive shaft;
a plurality of transporting belts, driven by the drive shaft and configured to transport glass substrates at an operating speed when the drive shaft is driven by the drive motor;
a rail, arranged between the plurality of transporting belts;
a pushing block, arranged on the rail and moving along a transporting direction of the glass substrates at a moving speed in accordance with the operating speed of the transporting belts, for pushing the glass substrate to shift horizontally along the transporting direction of the glass substrate to prevent the glass substrate from being crooked; and
wherein the pushing block comprises a cylinder, a first bump, and a second bump; the first bump is connected to a piston rod of the cylinder; the piston rod drives the first bump to move along a direction perpendicular to a plane of the glass substrate; the second bump is arranged on the first bump; the first bump extends along a direction parallel to the plane of the glass substrate; the second bump extends along the direction perpendicular to the plane of the glass substrate.

9. The processing system of claim 8, wherein the rail extends along the transporting direction of the glass substrate.

10. The processing system of claim 9, wherein the rail is fixed between the transporting belts so that the pushing block moves along the transporting direction of the glass substrate along the rail.

11. The processing system of claim 9, wherein the pushing block and the rail are fixedly connected so that the rail moves along the transporting direction of the glass substrate.

12. The processing system of claim 11, wherein the number of both of the pushing block and the rail is two, and the two pushing blocks are arranged on the two rails respectively and move simultaneously.

13. The processing system of claim 12, wherein the number of both of the pushing block and the rail is two, and the two pushing blocks are arranged on the two rails respectively and move simultaneously.

14. The processing system of claim 13, wherein the first bump and the second bump are integrally formed.

\* \* \* \* \*